(12) United States Patent
Jiang et al.

(10) Patent No.: US 8,019,838 B2
(45) Date of Patent: Sep. 13, 2011

(54) AUTONOMOUS OPERATION OF NETWORKING DEVICES

(75) Inventors: Michael Zhihe Z Jiang, Lake in the Hills, IL (US); Yan Liu, Hanover Park, IL (US); John C. Strassner, North Barrington, IL (US); Jing Zhang, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 367 days.

(21) Appl. No.: 12/124,560

(22) Filed: May 21, 2008

(65) Prior Publication Data

US 2009/0292793 A1    Nov. 26, 2009

(51) Int. Cl.
*G06F 15/177* (2006.01)
(52) U.S. Cl. ............... 709/221; 709/224; 370/225
(58) Field of Classification Search .......... 709/221, 709/225; 370/225
See application file for complete search history.

(56) References Cited

U.S. PATENT DOCUMENTS

| | | | | |
|---|---|---|---|---|
| 5,509,121 | A * | 4/1996 | Nakata et al. | 709/230 |
| 6,947,384 | B2 * | 9/2005 | Bare | 370/235 |
| 6,990,518 | B1 | 1/2006 | Secer | |
| 7,154,862 | B2 | 12/2006 | Krzyzanowski | |
| 7,225,309 | B2 | 5/2007 | DeWitt et al. | |
| 7,296,194 | B1 * | 11/2007 | Lovy et al. | 714/57 |
| 7,509,540 | B1 * | 3/2009 | Lovy et al. | 714/57 |
| 2003/0044162 | A1 * | 3/2003 | Angel | 386/55 |
| 2006/0031427 | A1 * | 2/2006 | Jain et al. | 709/220 |
| 2006/0200494 | A1 | 9/2006 | Sparks | |
| 2007/0022185 | A1 * | 1/2007 | Hamilton et al. | 709/220 |
| 2007/0109958 | A1 * | 5/2007 | Fehrmann et al. | 370/217 |
| 2008/0056123 | A1 * | 3/2008 | Howard et al. | 370/225 |
| 2008/0069123 | A1 * | 3/2008 | Nagata et al. | 370/401 |
| 2009/0055461 | A1 * | 2/2009 | Georgis et al. | 709/201 |
| 2010/0015926 | A1 * | 1/2010 | Luff | 455/67.13 |

* cited by examiner

*Primary Examiner* — Wing F Chan
*Assistant Examiner* — Tesfay Yohannes
(74) *Attorney, Agent, or Firm* — Brian M. Mancini; John T. Bretscher; Valerie M. Davis

(57) ABSTRACT

A system, method, and information processing system for managing a configuration of a network device. A current state associated with at least one network device (104) is determined (206). A set of commands (118) available for the current state of the network device (104) is retrieved (208). A next state associated with a current command is determined (216) for each command in the set of commands (118). A transition from the current state to the next state is created (218, 222) in response to determining a next state associated with a current command. A transition is determined to have been created for each command in the set of commands (118). An extended finite state machine (120) is created that includes at least the current state, the next state, and the transition for each of the commands in the set of commands (118).

14 Claims, 4 Drawing Sheets

```
         ┌ LET OPTIMAL_PATH = NULL
         │ LET OPTIMAL_PATH_COST = MAX_COST
         │ LET RECURRENT BE THE CURRENT RESOURCE CONFIGURATION
    302 ─┤ LET RTARGET BE THE TARGETED RESOURCE CONFIGURATION
         │ LET DELTA = RTARGET - RECURRENT (i.e., THE DIFFERENCE IN CONFIGURATIONS)
         │ SET QUEUE TO EMPTY
         └ ADD STARTSTATE TO QUEUE
         ┌ WHILE (QUEUE IS NOT EMPTY) DO
         │   GET STATE FROM QUEUE
         │   FOR (EACH TRANSITION AND IT'S NEXTSTATE ORIGINATING FROM STATE) DO
         │     SET NEW_DELTA = COMPUTE_DELTA(DELTA, STARTSTATE, NEXTSTATE)
         │     IF (NEW_DELTA <=0) THEN // A NEW PATH FOUND
         │       LET_PATH_COST = COMPUTE_PATH_COST_FROM_MODE(NEW_PATH)
         │       IF (OPTIMAL_PATH = NULL OR PATH_COST < OPTIMAL_PATH_COST)
    304 ─┤     THEN
         │           OPTIMAL_PATH = NEW+PATH
         │           OPTIMAL_PATH_COST = PATH_COST
         │       END IF
         │     ELSE
         │       ADD NEXTSTATE TO QUEUE
         │     END IF
         │   END FOR
         └ END WHILE
         ┌ IF (OPTIMAL_PATH = NULL) THEN
         │     RETURN FAILURE //NO PATH IS FOUND
    306 ─┤ ELSE
         │     RETURN OPTIMAL_PATH // A PATH IS FOUND
         └ END IF
```

*FIG. 3*

AUTONOMOUS OPERATION OF NETWORKING DEVICES

FIELD OF THE INVENTION

The present invention generally relates to the field of network monitoring and management, and more particularly relates to managing access to electronically available information assets.

BACKGROUND OF THE INVENTION

Networks consist of heterogeneous computing/network elements, each with its own distinct set of functions and commands to perform these functions. In particular, each computing element may have different functionality, use different protocols, and be implemented differently. Network elements provide a set of commands (in various formats) for the provisioning, operation, control, and query for status information of the elements. Network elements are designed for human operators to install, provision, and maintain elements in a network environment. Current technologies generally do not provide mechanisms to automate these human tasks and integrate them into the autonomic architecture for supporting autonomic networking systems.

More specifically, current technologies generally do not provide mechanisms that 1.) translate policies and service requests into a specific sequence of commands to operate, administrate, and provision a network element; 2.) integrate with information and data models to manage the status, faults, and resource allocations requested of networking elements to build Extended Finite State Machines ("EFSMs") and update them with sensed information; 3.) optimize the allocation of resources and manage the operation of the network element, especially in the face of unplanned change in environmental conditions, interaction with different elements, and changing user and business objectives; and 4.) enable the autonomous operation of network elements governed by policies rather than element-specific operations.

Although some conventional systems provide autonomic architectures and policy-based management to achieve system-wide optimization of networking resources to meet business needs, a mechanism has not yet been defined to prescribe how commands can be sent to devices to orchestrate control based on their current state.

Therefore a need exists to overcome the problems with the prior art as discussed above.

SUMMARY OF THE INVENTION

In one embodiment, a method for managing a configuration of a network device is disclosed. The method includes determining a current state associated with at least one network device. A set of commands available for the current state of the network device is retrieved. A next state associated with a current command is determined for each command in the set of commands. A transition from the current state to the next state is created in response to determining a next state associated with a current command. A transition is determined to have been created for each command in the set of command. An extended finite state machine is created that includes at least the current state, the next state, and the transition for each of the commands in the set of commands.

In another embodiment, an information processing system for managing a configuration of a network device is disclosed. The information processing system includes a memory and a processor that is communicatively coupled to the memory. The information processing system also includes an autonomic manager that is communicatively coupled to the memory and the processor. The autonomic manager is adapted to determine a current state associated with at least one network device. A set of commands available for the current state of the network device is retrieved. A next state associated with a current command is determined for each command in the set of commands. A transition from the current state to the next state is created in response to determining a next state associated with a current command. A transition is determined to have been created for each command in the set of command. An extended finite state machine is created that includes at least the current state, the next state, and the transition for each of the commands in the set of commands.

In yet another embodiment, a system for managing a configuration of a network device is disclosed. The system includes at least one network device and at least one information processing system that is communicatively coupled to the at least one network device. The information processing system includes a memory and a processor that is communicatively coupled to the memory. The information processing system also includes an autonomic manager that is communicatively coupled to the memory and the processor. The autonomic manager is adapted to determine a current state associated with the at least one network device. A set of commands available for the current state of the network device is retrieved. A next state associated with a current command is determined for each command in the set of commands. A transition from the current state to the next state is created in response to determining a next state associated with a current command. A transition is determined to have been created for each command in the set of command. An extended finite state machine is created that includes at least the current state, the next state, and the transition for each of the commands in the set of commands.

An advantage of the various embodiments of the present invention is that a model-integrated, state-based control mechanism and apparatus is presented that orchestrates the autonomous operations of networking devices. The various embodiments present automated generation of the state-based control mechanisms for heterogeneous network elements and integration of information and data models with the generated state machine to realize the autonomous operation and management of heterogeneous network elements. A control mechanism realizes autonomous operations and control at the element level and enables the enforcement of policies from network systems down to heterogeneous networking elements to support autonomous operations.

Another advantage of the various embodiments is that they construct an autonomous control mechanism for a network element based on its command set. This various embodiments use a data model to represent the functionality of the device's command set, and instance models to represent the current configuration of the network element. An extended finite state machine is constructed to govern the operation of a device based on the set of available commands and their effects at any particular state. From its initial state, new states are created based on device commands available at those states.

The various embodiments recursively enumerate through the generated states and construct their next states based on available commands. A transition between two states represents the execution of one or more device commands; the effect of the transition is recorded in the model instances. The resultant EFSM includes a finite number of states and transitions that are used to efficiently control the operation of the device. In this way, the behavior of a device can be orchestrated by controlling the state transitions of the device.

Another advantage is that policies and service requests are translated into a specific sequence of commands to operate, administrate, and provision a network element. The various embodiments can integrate with information and data models to manage the status, faults, and resource allocations requested of networking elements to build EFSMs and update them with sensed information. The allocation of resources can be optimized and the operation of the network element can be managed, especially in the face of unplanned change in environmental conditions, interaction with different elements, and changing user and business objectives. Also, the autonomous operation of network elements can be enabled and governed by policies rather than element-specific operations.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 3 is pseudo code illustrating one example of determining an optimal configuration of a networking element according to one embodiment of the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

General Operating Environment

Figure 1:
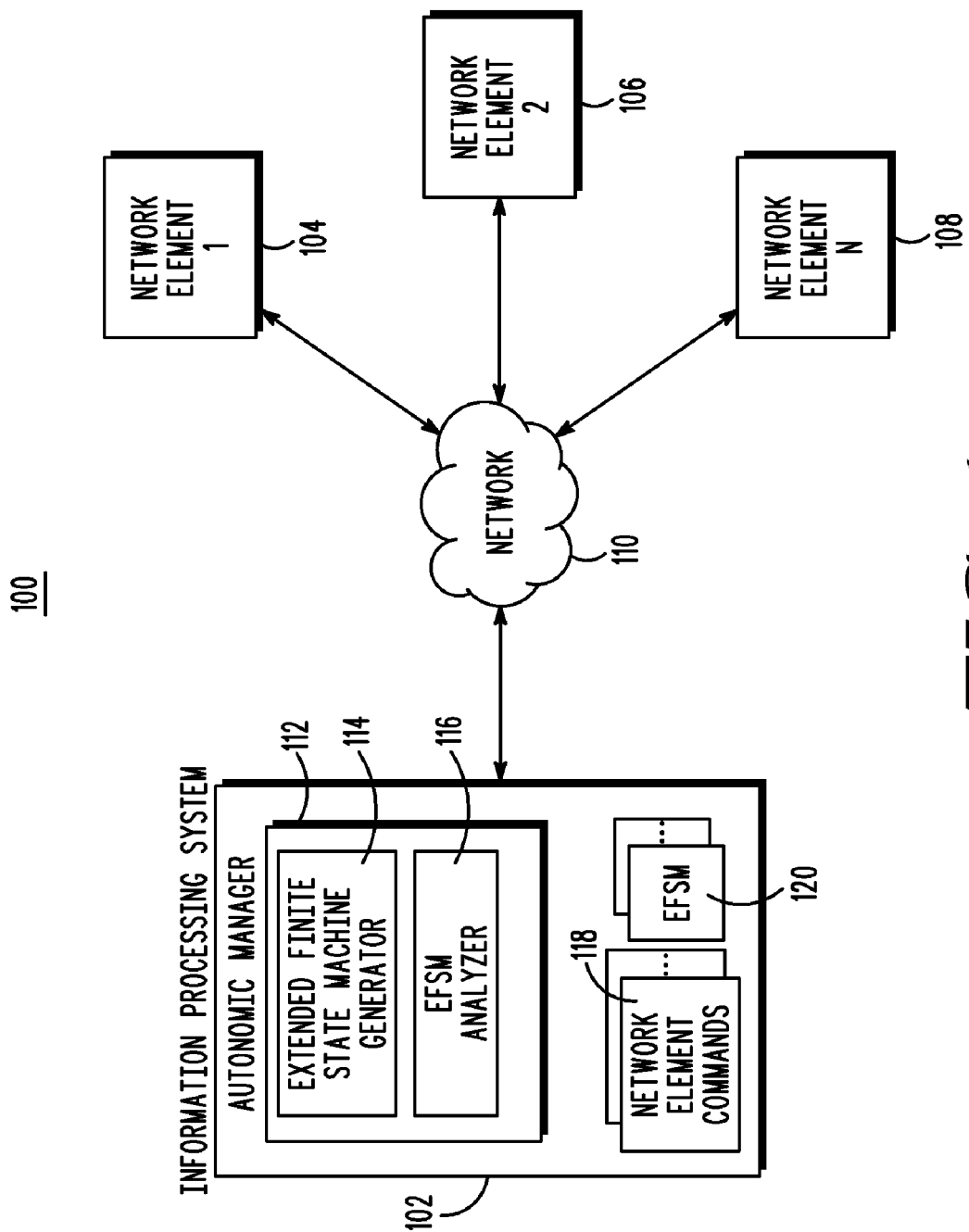
FIG. 1 is a block diagram illustrating a general overview of an operating environment according to one embodiment of the present invention.

According to one embodiment of the present invention as shown in FIG. 1 a general overview of an operating environment 100 is illustrated. In particular, the operating environment 100 includes one or more information processing systems 102 communicatively coupled to one or more network elements 104, 106, 108. A network element, in one embodiment, can be (but not limited to) routers, switches, hubs, gateways, base stations, and wireless communication devices. The information processing system 102 is communicatively coupled to each of the network elements 104, 106, 108 via one or more networks 110, which can comprise wired and/or wireless technologies.

The information processing system, in one embodiment, includes an autonomic manager 112, which comprises an EFSM generator 114 and an EFSM analyzer 116, and network element command sets 118. It should be noted that although the EFSM generator 114 and EFSM analyzer 116 are shown residing within the autonomic manager 112, one or more of these components can reside outside of the autonomic manager 112 as well.

The autonomic manager 112, in one embodiment, utilizes a model-integrated, state-based control mechanism that orchestrates autonomous operations of the networking elements 104, 106, 108. Autonomic Architectures applicable to the various embodiments of the present invention are discussed in greater detail in the following U.S. patent application Ser. No. 11/422,681, filed on Jun. 7, 2006 entitled "Method and Apparatus for Realizing an Autonomic Computing Architecture Using Knowledge Engineering Mechanisms", and U.S. patent application Ser. No. 11/618,125, filed on Dec. 29, 2006, entitled, "Method and apparatus to use graph-theoretic techniques to analyze and optimize policy deployment", which are both incorporated by reference in the entireties.

The autonomic manager 112 in conjunction with the network-wide architecture and optimization of policy deployment provided in the above incorporated U.S. patent applications, provides a novel control mechanism to realize autonomous operations and control at the network element level. This enables the enforcement of policies from network systems down to heterogeneous networking elements to support autonomous operations.

The autonomic manager 112, in one embodiment, constructs an autonomous control mechanism for a network element 104, 106, 108 based on its command set 118, which is designed by device vendors to provision, control, and operate the network element 104, 106, 108. In one embodiment, the autonomic manager 112 uses a data model to represent the functionality of the element's command set, and instance models to represent the current configuration of the network element. Information/data models of networking elements are further discussed in Strassner, J., and Reilly, J., "Introduction to the SID", TMW University Program, May 2006 and Strassner, J., "Policy-Based Network Management", Morgan Kaufman Publishers, September 2003, ISBN 1-55860-859-1, which is hereby incorporated by reference in its entirety.

The autonomic manager 112 constructs the autonomous control mechanism, by generating one or more EFSMs 120 via the EFSM generator 114 to govern the operation of a network element 104, 106, 108 based on the set of available commands 118 and their effects at any particular state. An EFSM 120 is a generalization of a Finite State Machine ("FSM"). An EFSM is differentiated from a conventional FSM in that a transition is associated with a set of input Boolean conditions and a set of output Boolean functions. In an EFSM, enabling conditions and data operations can be complex statements that can lead to a more compact and powerful representation. An EFSM retains the advantages of a conventional FSM while overcoming its state explosion.

Starting with an initial state of the network element 104, the EFSM generator 114 creates new states based on the network element commands available at those states. The EFSM generator 114 recursively enumerates through the generated states and constructs their next states based on available commands 118. A transition between two states represents the execution of one or more device commands; the effect of the transition is recorded in the model instances. The resultant EFSM 120 includes a finite number of states and transitions that are used to efficiently control the operation of the network element 104. In this way, the autonomic manager 112 can orchestrate the behavior of a network element by controlling the state transitions of the element.

An advantage of the various embodiments is that the autonomic manager 112 is able to direct the autonomous operation of a network element based on operational requirements rather than device-specific commands. Given a set of service requirements, the autonomic manager 112 can determine how to meet those service requirements based on the states of the constructed EFSM 120 and information from the data and instance models of a network element. The control autonomic manager 112 directs the network element to execute the sequence of commands defined in the EFSM autonomously to reach the goal defined by the service requirement.

For example, U.S. patent application Ser. No. 11/617,369, filed on Dec. 28, 2006, entitled "Method and Apparatus to Translate a Policy or Set of Policies into Different Forms, Thereby Creating and Managing a Policy Continuum", which is hereby incorporated by reference in its entirety, discusses how different policies can be related to each other, thereby forming a continuum of policies at different abstraction levels. The various embodiments of U.S. patent application Ser. No. 11/617,369 can be used to relate high-level system rules to low level policies that define commands to be issued. Then, the autonomic manager 112 builds an EFSM 120 that orchestrates the behavior of the device by current, determining what the state of the device is; second, comparing said state to its desired state; third, if the current state is not equal to its desired state, then the EFSM identifies a set of commands to issue to change the current state of the device one or more times until it reaches its desired state.

The various embodiments of the present invention define how the current state of the EFSM and the instance values of the data models capture complete structural and behavior information of the network element. The information is also readily available to upper autonomous management entities (e.g. autonomic manager) to support system-wide management and optimization by reading the current values of the instance model and the EFSM.

Current systems do not provide automated generation of the state-based control mechanisms for heterogeneous network elements and the integration of information and data models with the generated state machine to realize the autonomous operation and management of heterogeneous network elements. However, the following is more detailed discussion how the various embodiments overcome these deficiencies of current systems and the other deficiencies discussed above.

Figure 2:
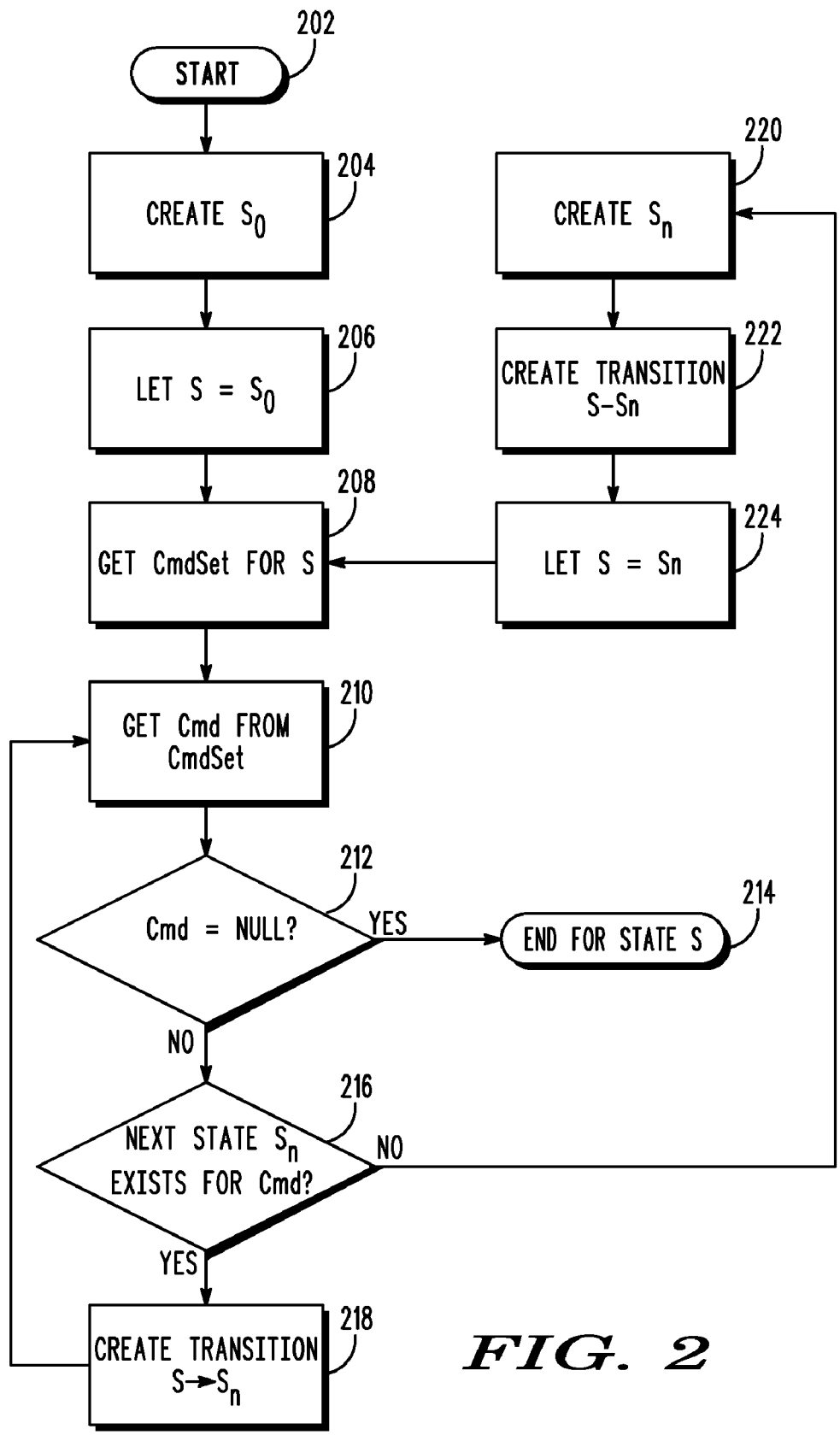
FIG. 2 is an operational flow diagram illustrating one example of constructing an Extended Finite State Machine for autonomous operation of networking elements according to one embodiment of the present invention.

In particular, the following discussion is given with respect to FIG. 2, which is an operational flow diagram illustrating one example of constructing an EFSM. The operational flow diagram of FIG. 2 begins at step 202 and flows directly to step 204. The EFSM generator 114, at step 204, creates initial state $S_0$ to represent the state of the network element after the element starts up and completes its initialization. The EFSM generator 114, at step 206, sets the current state S to $S_0$. The EFSM generator 114, at step 208, obtains the set of commands $\{C_1, C_2 \ldots C_n\}$ that are valid under initial state $S_0$. The objective is to not simply enumerate any command that could be issued, but rather to enumerate the set of commands that can be used to affect a meaningful state change.

For example, if the goal is to configure traffic engineering commands, commands that have nothing to do with that goal, such as SMTP settings, are available but not relevant or meaningful. Relevance, in one embodiment, is established by reading in the list of higher-level goals established by policies and relating them to commands via the policy continuum. The various embodiments of U.S. patent application Ser. No. 11/617,369, filed on Dec. 28, 2006, entitled "Method and Apparatus to Translate a Policy or Set of Policies into Different Forms, Thereby Creating and Managing a Policy Continuum", can be used to determine relevance, as they establish a formal way to determine the semantic relationship between commands and the goals of the policies.

The EFSM generator 114, at step 210, selects a command from the set of commands and determines if at step 212 if a command was able to be selected. If the EFSM generator 114 determines that no commands in the command set are available, the operational flow ends for the current state S at step 214. For example, the EFSM generator 114 may have already processed each command in the command set. If the EFSM generator 114 determines that there are more commands to be processed, a command is selected and the EFSM generator 114, at step 216, determines if a next state $S_n$ already exists for the selected command. If the next state $S_n$ already exists, a transition, at step 218, from the current state S to the next state $S_n$ is created.

However, if a next state $S_n$ does not already exist then the EFSM generator 114, at step 220, creates the next state $S_n$. The EFSM generator 114, at step 222, then creates a transition $S$-$S_n$, which is a transition from the current state S to the next state $S_n$. The transaction command associated with the transaction is the selected command $C_i$. The enabling condition is obtained from model instances of the information and data models of the network element to determine whether the transition action can be enabled. The action part of the transition specifies how the model instances are updated to reflect the status and resource allocation of the network element. This is to ensure the model instances accurately reflect the status of the network element.

The EFSM generator 114, at step 224, then sets the current state S to the next state $S_n$. The control flow then returns to step 208 to obtain the set of commands $\{G_1, C_2 \ldots C_m\}$ that are valid under the current state (which is a new state) and recursively repeats the process discussed above. The construction process ends when a new state is not required.

Policy-Directed Autonomous Operation

Once an EFSM for a network element has been created using the process discussed above, the autonomic manager 112 can orchestrate the autonomous operation of a network element to ensure the network element is configured to meet the service requirements defined by policies. The operation of a network element is governed by policies at the network level. See, for example, Strassner, J., "Policy-Based Network Management", Morgan Kaufman Publishers, September 2003, ISBN 1-55860-859-1. As discussed in, for example, U.S. patent application Ser. No. 11/422,681, filed on Jun. 7, 2006 entitled "Method and Apparatus for Realizing an Autonomic Computing Architecture Using Knowledge Engineering Mechanisms", and U.S. patent application Ser. No. 11/618,125, filed on Dec. 29, 2006, entitled, "Method and apparatus to use graph-theoretic techniques to analyze and optimize policy deployment", which are both incorporated by reference in the entireties, higher level policies determine the operational and service requirements of network elements. The various embodiments of the present invention orchestrate the autonomous operation of a network element to ensure the network element is configured to meet the service requirements defined by policies.

Goal-oriented search (See, for example, Hart, P., Nilsson, N., and Raphael, B, "A Formal Basis for the Heuristic Determination of Minimum Cost Paths", IEEE Transactions of Systems Science and Cybernetics, Vol. ssc-4, No. 2, JULY 1968, which is hereby incorporated by reference in its entirety) can be used for the implementation of the autonomous operation of the network element. Here, the goal is the desired state determined by policies. The goal-oriented search is to find a path (representing a sequence of commands) that leads to the desired configuration from the current configuration.

Given the current configuration of the network element (this can be queried from the model instances, and is represented by a state) and the targeted configuration to be reached (which is represented by a different state), the configuration changes can be computed and translated to a set of one or more state transitions. This forms a path in the EFSM. Hence, the EFSM analyzer 116 searches the EFSM for a path such that the target state can be reached. The autonomic manager 112 directs the network element to execute commands determined by the path and update the model instances accordingly. Upon completion, the network element has reached its targeted configuration and the model instances are updated to reflect that status of the network element. This can be easily checked by comparing the changed network configuration to each state in the chosen path.

It should be noted that multiple paths can exist, as there may be several ways to reach the desired state from the current state. In this case, the EFSM analyzer 116 uses one or more mechanisms to choose the optimal path, according to one or more metrics. For example, each transition can be assigned a "cost", and the search algorithm is constructed to minimize this cost.

To meet a given goal, depth-first, breadth-first, or other search algorithms can be applied to find an optimal path. It should be noted that the cost associated with a command is specified in data models. The total cost for a path can be computed and used to determine the optimal path. FIG. 3 illustrates pseudo code for one embodiment implementing a breadth-current algorithm to find an optimal path for meeting a specified target configuration "Target" from the current configuration "RCurrent". For example, a current configuration can be a network element allocated with 5 Mbps bandwidth and the target configuration can be 10 Mbps bandwidth.

The statement set 302 initializes various variables that are used throughout the algorithm. For example optimal_path is set to Null; optimal_path_cost is set to MAX_COST; Rcurrent is set to the current resource configuration; Rtarget is set to the targeted resource configuration; delta is set to Rtarget−Rcurrent (which is the difference between the configurations. For example, if the Rcurrent represents the allocated bandwidth of 64K and the Rtarget of 256K, the delta will be 188K. The queue is then set to empty and startqueue is added to queue.

The search starts from the initial state "startState", which has been added to the queue as discussed above. With respect to statement set 304, while the queue is not empty (if queue was empty then all the states have been processed), the state within the queue is retrieved. In the current example, the state within the queue is the "startState". For each transition and the resulting nextState originating from the current state being processed (e.g., "startState") the EFSM analyzer 114 determines whether the target state has been reached.

For example, the EFSM analyzer 114 determines a new delta, which is the delta from the current state (StartState in this example,) to the next state (e.g., set new_delta=compute_Delta(delta, startState, nextState). Take for example, a state_1 and a state_2. The EFSM analyzer 114 determines the delta between state_1 and state_2 to determine if the job/request can be completed. Using the example above, the EFSM analyzer 114 determines if the path from state_1 to state_2 can satisfy the 5 Mbps to 10 Mbps bandwidth request. If this determination is positive (e.g., new_delta<=0) the EFSM flags this path as a potential candidate for satisfying the job/request. It should be noted that this process is performed for each possible path in the EFSM. The path, which represents a path from the current state to the target represents the sequence of commands needed to configure the device 104 to achieve the requested configuration (e.g. 5 Mbps bandwidth to 10 Mbps bandwidth).

The EFSM analyzer 114 then calculates the path cost associated with the new path from the model discussed above (e.g., let path_cost=compute_path_cost_from_model(new_path). If a current optimal path does not exist or if the path cost associated with the current new path is less than a current optimal cost, then the current new path is set to the optimal path. The optimal cost is then set to the path cost of the current new path. An optimal path may not exist (e.g., optimal_path=NULL) if the EFSM analyzer 114 has not identified a path that can complete the job/request (e.g. new_delta>0).

The EFSM analyzer 114 then adds the next state to the queue and performs the above process until all of the states have been processed. As shown by statement set 306, if the EFSM analyzer 114 determines that an optimal path cannot be found (e.g., optimal_path=NULL), it returns a failure message to the autonomic manager 112. However, if the EFSM analyzer 114 has identified an optimal path, it returns this optimal path to the autonomic manager 112.

As can be seen from the above discussion, the various embodiments of the present invention capture the behaviors of diverse network elements to enable autonomous operation directed by management policies. The lowest level (e.g. instance view as discussed in U.S. patent application Ser. No. 11/617,369, filed on Dec. 28, 2006, entitled "Method and Apparatus to Translate a Policy or Set of Policies into Different Forms, Thereby Creating and Managing a Policy Continuum", which is hereby incorporated by reference in its entirety, of the policy continuum is related to configuration commands to state information, thereby facilitating the orchestration of behavior. The various embodiments integrate the behavior of network elements with information and data models to represent a complete and accurate status of the network element, including faults and resource allocation.

Further, a formal modeling approach has been presented to enable the optimization of command-oriented configurations. The model integrated mechanism provides a uniform approach to deploy policies across heterogeneous network elements to support autonomic management. Autonomic managers such as the autonomic manager 112 direct the operations of network elements based on service requirements rather than element-specific operations.

The various embodiments facilitate the implementation of the autonomic architectures in managing heterogeneous network elements by integrating with information models, data models, and policy models. The various embodiments also presented mechanisms that discover functional similarities and equivalencies among diverse commands of different network elements.

While different network elements may have very different commands, the various embodiments can use the effects of a command or a sequence of commands to infer their similarity and equivalency. For example, the command sequences $SEQ_a$ of element A and the command sequences $SEQ_b$ of element B are functionally equivalent if their effects are the same (e.g. both allocate 64K constant bite rate service).

Computing System

Figure 4:
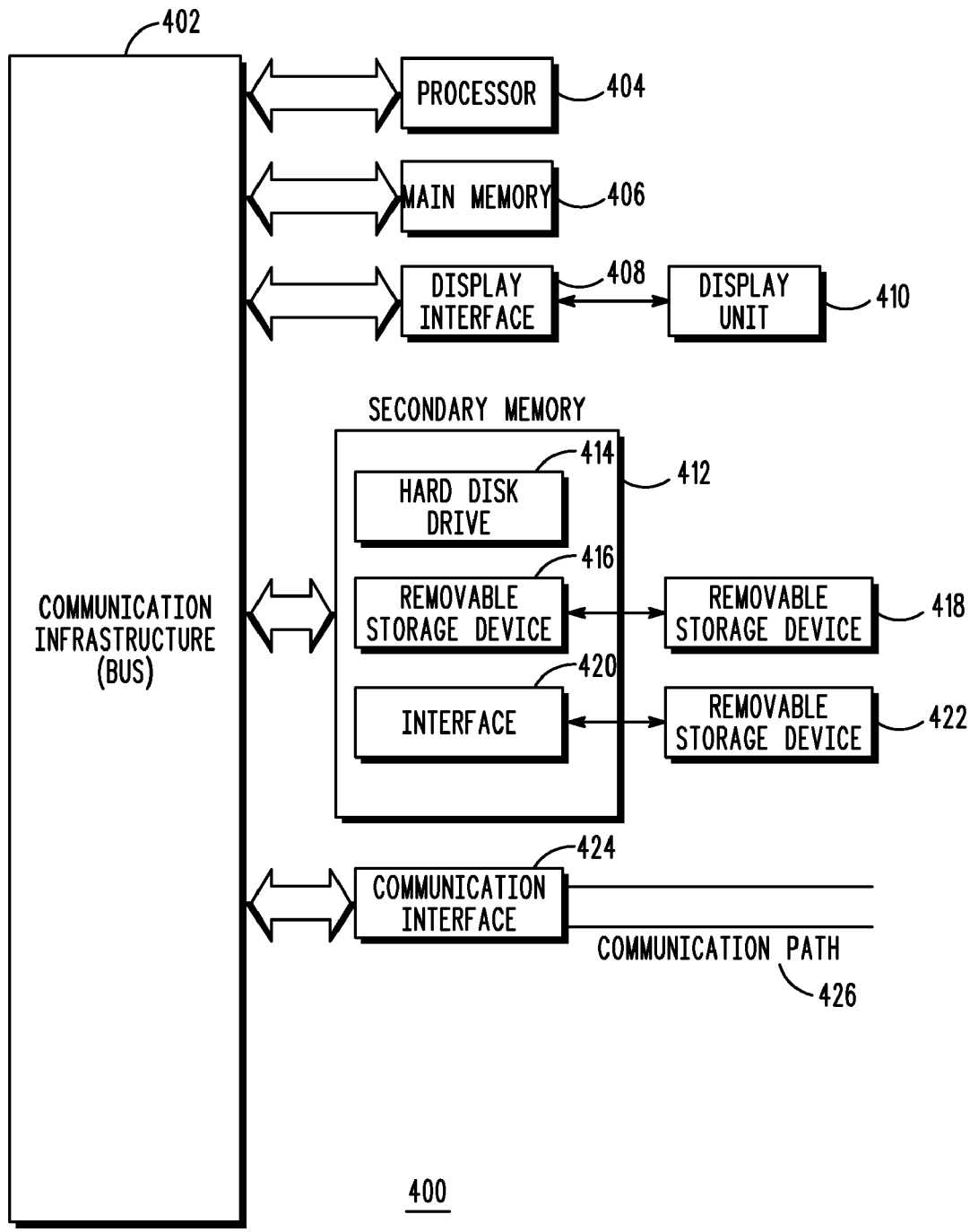
FIG. 4 is a block diagram illustrating a detailed view of an information processing system, according to one embodiment of the present invention.

FIG. 4 is a high level block diagram illustrating a more detailed view of a computing system 400 such as the information processing system 102 useful for implementing the autonomic manager 112 according to embodiments of the present invention. The computing system 400 is based upon a suitably configured processing system adapted to implement an exemplary embodiment of the present invention. For example, a personal computer, workstation, or the like, may be used.

In one embodiment of the present invention, the computing system 400 includes one or more processors, such as processor 404. The processor 404 is connected to a communication infrastructure 402 (e.g., a communications bus, crossover bar, or network). Various software embodiments are described in terms of this exemplary computer system. After reading this description, it becomes apparent to a person of ordinary skill in the relevant art(s) how to implement the invention using other computer systems and/or computer architectures.

The computing system 400 can include a display interface 408 that forwards graphics, text, and other data from the communication infrastructure 402 (or from a frame buffer) for display on the display unit 410. The computing system 400 also includes a main memory 406, preferably random access memory (RAM), and may also include a secondary memory 412 as well as various caches and auxiliary memory as are normally found in computer systems. The secondary memory 412 may include, for example, a hard disk drive 414 and/or a removable storage drive 416, representing a floppy disk drive, a magnetic tape drive, an optical disk drive, and the like. The removable storage drive 416 reads from and/or writes to a removable storage unit 418 in a manner well known to those having ordinary skill in the art.

Removable storage unit 418, represents a floppy disk, a compact disc, magnetic tape, optical disk, etc. which is read by and written to by removable storage drive 416. As are appreciated, the removable storage unit 418 includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer-readable information.

In alternative embodiments, the secondary memory 412 may include other similar means for allowing computer programs or other instructions to be loaded into the computing system 400. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to the computing system 400.

The computing system 200, in this example, includes a communications interface 424 that acts as an input and output and allows software and data to be transferred between the computing system 400 and external devices or access points via a communications path 426. Examples of communications interface 424 may include a modem, a network interface (such as an Ethernet card), a communications port, a PCM-CIA slot and card, etc. Software and data transferred via communications interface 424 are in the form of signals which may be, for example, electronic, electromagnetic, optical, or other signals capable of being received by communications interface 424. The signals are provided to communications interface 424 via a communications path (i.e., channel) 426. The channel 426 carries signals and may be implemented using wire or cable, fiber optics, a phone line, a cellular phone link, an RF link, and/or other communications channels.

In this document, the terms "computer program medium," "computer usable medium," "computer readable medium", "computer readable storage product", and "computer program storage product" are used to generally refer to media such as main memory 406 and secondary memory 412, removable storage drive 416, and a hard disk installed in hard disk drive 414. The computer program products are means for providing software to the computer system. The computer readable medium allows the computer system to read data, instructions, messages or message packets, and other computer readable information from the computer readable medium.

Computer programs (also called computer control logic) are stored in main memory 406 and/or secondary memory 412. Computer programs may also be received via communications interface 424. Such computer programs, when executed, enable the computer system to perform the features of the various embodiments of the present invention as discussed herein. In particular, the computer programs, when executed, enable the processor 404 to perform the features of the computer system.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for managing a configuration of a network device, the method comprising:
   determining a current state associated with at least one network device;
   retrieving a set of commands available for the current state of the network device;
   determining, for each command in the set of commands, a next state associated with a current command;
   creating, in response to determining a next state associated with a current command, a transition from the current state to the next state;
   determining that a transition has been created for each command in the set of commands;
   creating an extended finite state machine comprising at least the current state, the next state, and the transition for each of the commands in the set of commands;

determining, from the extended finite state machine, at least one set of transitions required to reach a target state from the current state of the network device;

selecting one of the at least one set of transitions based on one or more metrics; and directing the network element to execute commands corresponding to the selected set of transitions.

2. The method of claim 1 wherein creating the transition from the current state to the next state comprises:

determining that the next state already exists; and creating a transition from the current state to the next state, wherein the current state is the next state.

3. The method of claim 2 further comprising:

selecting at least one other command from the set of commands;

determining, for the at least one other command, that a next state associated with the at least one other command already exists; and creating, in response to determining that a next state associated with the at least one other command already exists, a transition from the current state to next state associated with the at least one other command.

4. The method of claim 1 wherein the creating transition from the current state to the next state comprises:

determining that the next state is a new state;

creating a new state associated with the network device; and creating a transition from the current state to the new state.

5. The method of claim 4 further comprising:

setting the current state to the new state;

retrieving a new set of commands associated with the network device available for the new state;

determining, for at least one command in the new set of commands, a next state associated with the at least one command; and creating, in response to determining a next state associated with the at least one command, a transition from the current state to the next state.

6. The method of claim 1 further comprises:

identifying each path within the extended finite state machine, wherein each path comprises at least a start state and an end state; and calculating a cost associated with each path.

7. The method of claim 6, wherein calculating a cost associated with each path further comprises:

calculating a cost associated with a transition from each state within each path.

8. An information processing system for managing a configuration of a network device, the information processing system comprising:

a memory;

a processor communicatively coupled to the memory; and an autonomic manager communicatively coupled to the memory and the processor, wherein the autonomic manager is adapted to:

determine a current state associated with at least one network device;

retrieve a set of commands available for the current state of the network device;

determine, for each command in the set of commands, a next state associated with a current command;

create, in response to determining a next state associated with a current command, a transition from the current state to the next state;

determine that a transition has been created for each command in the set of commands;

create an extended finite state machine comprising at least the current state, the next state, and the transition for each of the commands in the set of commands;

determine, from the extended finite state machine, at least one set of transitions required to reach a target state from the current state of the network device;

select one of the at least one set of transitions based on one or more metrics; and direct the network element to execute commands corresponding to the selected set of transitions.

9. The information processing system of claim 8 wherein the autonomic manager is further adapted to create the transition from the current state to the next state by:

determining that the next state already exists; and creating a transition from the current state to the next state, wherein the current state is the next state, wherein the current state is the next state.

10. The information processing system of claim 9 wherein the autonomic manager is further adapted to:

select at least one other command from the set of commands;

determine, for the at least one other command, that a next state associated with the at least one other command already exists; and create, in response to determining that a next state associated with the at least one other command already exists, a transition from the current state to the next state associated with the at least one other command.

11. The information processing system of claim 8 wherein the autonomic manager is further adapted to create the transition from the current state to the next state by:

determining that the next state is a new state;

creating a new state associated with the network device; and creating a transition from the current state to the new state.

12. The information processing system of claim 11 wherein the autonomic manager is further adapted to:

set the current state to the new state;

retrieve a new set of commands associated with the network device available for the new state;

determine, for at least one command in the new set of commands, a next state associated with the at least one command; and create, in response to determining a next state associated with the at least one command, a transition from the current state to the next state.

13. The information processing system of claim 8 wherein the autonomic manager is further adapted to:

identify each path within the extended finite state machine, wherein each path comprises at least a start state and an end state; and calculate a cost associated with each path.

14. The information processing system of claim 13 wherein the autonomic manager is further adapted to calculate a cost associated with each path by:

calculating a cost associated with a transition from each state within each path.

\* \* \* \* \*

UNITED STATES PATENT AND TRADEMARK OFFICE
CERTIFICATE OF CORRECTION

PATENT NO. : 8,019,838 B2
APPLICATION NO. : 12/124560
DATED : September 13, 2011
INVENTOR(S) : Jiang et al.

It is certified that error appears in the above-identified patent and that said Letters Patent is hereby corrected as shown below:

In Fig. 2, Sheet 2 of 4, delete " 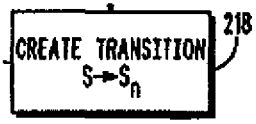 " and insert --  --, therefor.

In Column 6, Line 44, delete "$\{G_1, C_2 ... C_m\}$" and insert -- $\{C_1, C_2 ... C_m\}$ --, therefor.

Signed and Sealed this
Eighteenth Day of December, 2012

David J. Kappos
*Director of the United States Patent and Trademark Office*